Sept. 10, 1929. P. MARCHETTI Re. 17,428

MOTOR

Original Filed Jan. 20, 1926 2 Sheets-Sheet 1

WITNESSES

Lawrence D. Martin

Harry E. Seidel

INVENTOR

Paul Marchetti,

BY

Munn & Co.

ATTORNEY

Sept. 10, 1929. P. MARCHETTI Re. 17,428

MOTOR

Original Filed Jan. 20, 1926 2 Sheets-Sheet 2

WITNESSES

Laurence O. Hankin

Harry E. Seidel

INVENTOR

Paul Marchetti,

BY

Munn & Co

ATTORNEY

Reissued Sept. 10, 1929.

Re. 17,428

UNITED STATES PATENT OFFICE.

PAUL MARCHETTI, OF SAN FRANCISCO, CALIFORNIA, ASSIGNOR TO MARCHETTI-MOTOR PATENTS, INCORPORATED, A CORPORATION OF NEVADA.

MOTOR.

Original No. 1,624,269, dated April 12, 1927, Serial No. 82,540, filed January 20, 1926. Application for reissue filed July 14, 1928. Serial No. 292,697.

The general object of the invention is to provide means for eliminating the use of crank arms and their attendant bearings in the construction of reciprocating motors, and more particularly internal combustion motors.

A further object of the invention is the provision of a reciprocating internal combustion motor of the multi-cylinder type wherein the piston rods are arranged for operating cams carried by oppositely disposed shafts so that rotary movement is imparted to the shafts in the downward movement of the pistons.

A further object of the invention is to definitely fix the paths of the free ends of a pair of rods relative to one another, on the basis of a normal piston stroke and to shape the two cams cooperating with the two rods correspondingly so that the free ends of the piston rods remain in continuous contact with the two cams.

The above and other objects are accomplished by instrumentalities pointed out in the following specification.

The invention is clearly defined in the claims.

A satisfactory embodiment of the invention is illustrated in the accompanying drawings forming part of the specification and in which Figure 1 is a vertical cross section taken through a reciprocating internal combustion motor of the twin cylinder type and showing my invention applied thereto.

Figure 1:
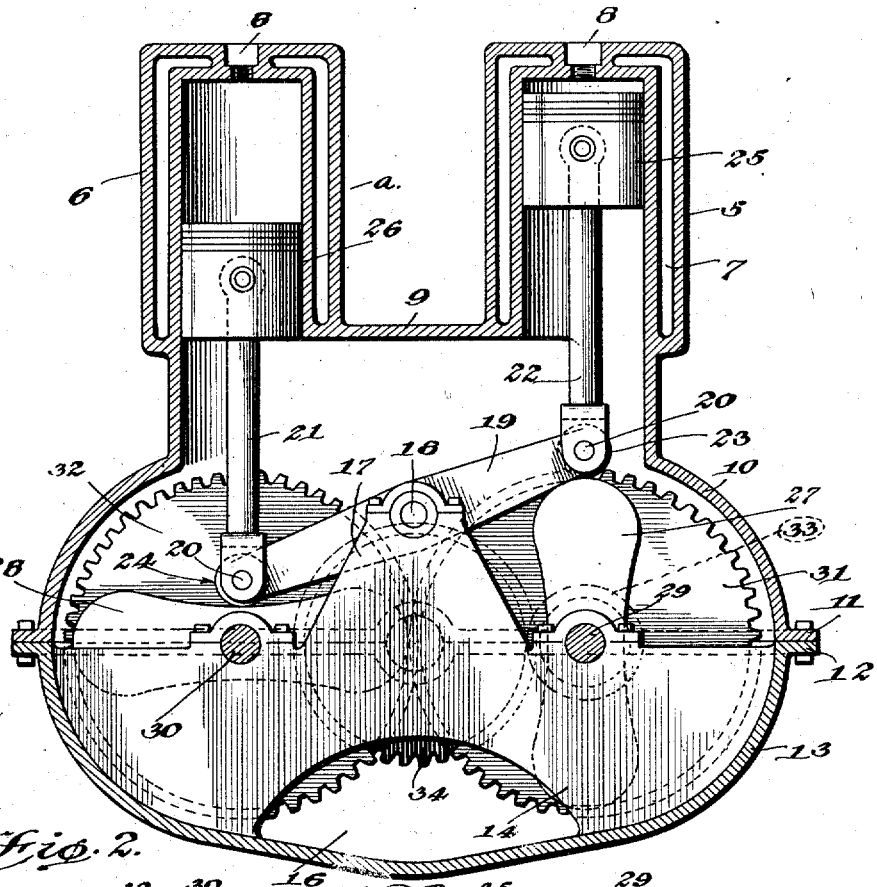

In Figure 1, the cylinder block *a* is shown to include a pair of upright cylinders 5 and 6 which are respectively provided with water jackets 7 and openings 8 in the tops thereof for the reception of spark plugs. A horizontal web 9 connects the adjacent inner sides of the cylinders 5 and 6 and is disposed at the base portions of the said cylinders as shown. The upper portion 10 of the casing depends from the cylinders 5 and 6, and the base of this portion 10 is provided with a peripheral flange 11 which is bolted to a similarly disposed flange 12 of the lower section 13 of the case, the case being the usual structure provided for internal combustion engines for holding lubricant and affording bearings for the motor shafts, the bearings for the shafts being located as usual in the front and rear walls of the case.

In carrying out the present invention, I provide interiorly disposed upright webs within the engine case. One of these webs is shown in Figure 1 and indicated by 14. For convenience in manufacture, the web 14 may be formed with the lower portion 13 of the case, and disposed in vertical alinement with the cylinders 5 and 6 located above. The structure about to be described may be regarded as being provided for each pair of cylinders of a motor when such cylinders are arranged as shown by 5 and 6 in Figure 1. The intermediate lower side portion of the web 14 is cut away to provide a passage 16 for the free flow of lubricant through the lower portion 13 of the case.

The intermediate portion of the upper side of the web 14 is extended vertically upward as at 17, and a bearing is provided therein for a pin 18 at the central portion of a beam 19, the opposite outer ends of which are loosely connected to pins 20 which extend transversely through the lower ends of piston rods 21 and 22, 23 and 24 indicate rollers disposed upon the pins 20 and located to one side of the outer ends of beam 19.

It will be seen that in this manner the paths followed by the connecting rods and the two rollers at the free ends thereof are clearly defined by the normal length of the piston strokes and the arc described by the pins 20 around the central pivot 18. When the piston rods 21 and 22 are forced downwardly by the pistons 25 and 26, the rollers 23 and 24 operate upon cams 27 and 28 which are rigidly secured to the engine shafts 29 and 30. The cams 27 and 28 are of a size and shape to correspond to the respective paths of the rollers 23 and 24, each cam being oblong as shown with rounded end edges and inwardly curved opposite sides and the two rollers therefore naturally remain in continuous contact with the cams. The cams are arranged so as to extend one at right angles to the other, so that when the cam on the right of Figure 1, for instance, extends upright or vertical, the cam on the left in the said figure will be disposed in the horizontal.

It will further be seen that the beam 19 with its fixed pivot constitutes a non-yielding connection between the two rollers 23 and 24 or between the free ends of the two connecting rods 21 and 22. The beam 19 may further be considered as consisting of two arms pivoted on the shaft 18 and non-yieldingly interconnected at the pivot.

The engine shafts 29 and 30 are connected together at one end by gear wheels 31 and 32, so that the shafts 29 and 30 rotate in opposed directions, and while in the position shown in Figure 1, the cam 28 limits the outward movement of the roller 24, it at the same time limits the inward movement of the roller 23 and firmly holds the same to the surface of cam 27.

Figure 2:
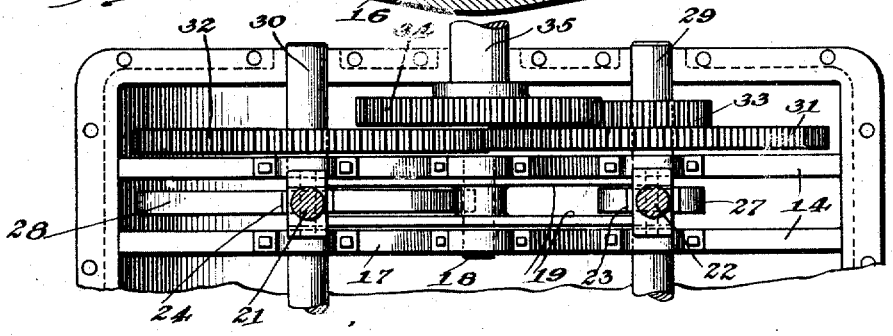
Figure 2 is a fragmentary plan view of the lower portion of the oil casing of the motor shown in Figure 1, and showing the gear connection between the motor shafts.

The power from the shafts 29 and 30 is taken off by a toothed pinion 33 which may be rigidly secured to the shaft 29 and disposed so as to mesh with a toothed wheel 34 which is rigidly secured to the drive shaft 35. The several shafts 29, 30 and 35 are disposed in usual bearings carried by the case, and the shafts 29 and 30 also have additional bearings in the web 14, as shown in Figures 1 and 2.

In the operation of the parts thus far described, it is to be noted that the piston 25 is at the end of its in or up stroke at the time that the piston 26 is at the end of its down or out stroke. In this connection it is to be observed that when a charge of fuel is exploded in one of the cylinders and forces the piston thereof outwardly, the piston in the opposite cylinder moves inwardly operating either to compress a charge therein or expel the products of a previously exploded charge therefrom. It may be assumed that with the parts positioned as shown in Figure 1, the piston 25 is at the end of its compression stroke, and the piston 26 at the end of its intake stroke, so that when the compressed charge is ignited in the cylinder 5 and the piston 25 moves downwardly, downward movement of the piston rod 22 operates to turn the cam 27 in the direction of the arrow.

The roller 23 turns upon the face of the cam 27 in the downward movement of the rod 22 and in the turning of the cam 27, and at the same time the beam 19 rocks and operates to move the piston rod 21 and the piston 26 upwardly and to compress a charge of fuel within the cylinder 6. The turning of the cam 27 turns the shaft 29, and motion is transmitted by the gear wheels 31 and 32 to the shaft 30, and likewise to the cam 28 so that the cam 28 operates to assist the beam 19 in moving the rod 21 and the piston 26 upwardly. At the time that the compressed charge in cylinder 6 is ignited, the pistons 25 and 26, together with the cams 27 and 28, occupy positions the reverse of those shown in Figure 1 of the drawings.

Figure 4:
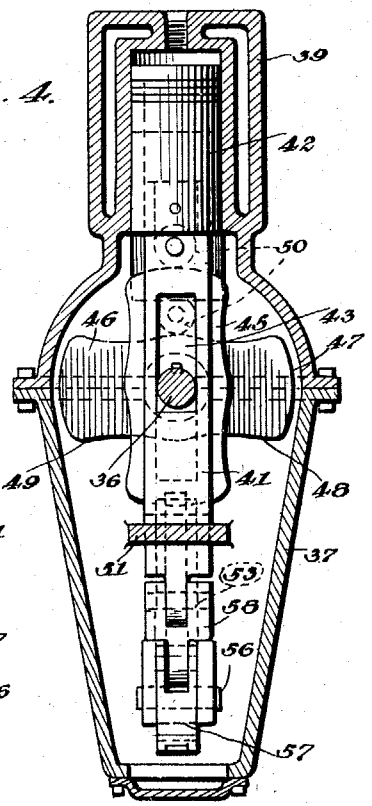
Figure 4 is a vertical cross section of the motor shown in Figure 3, and looking at right angles to Figure 3.
Figure 5:
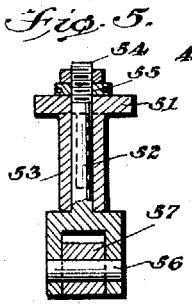
Figure 5 is a detail section of the beam hanger taken on the line 5—5 of Figure 3.
Figure 3:
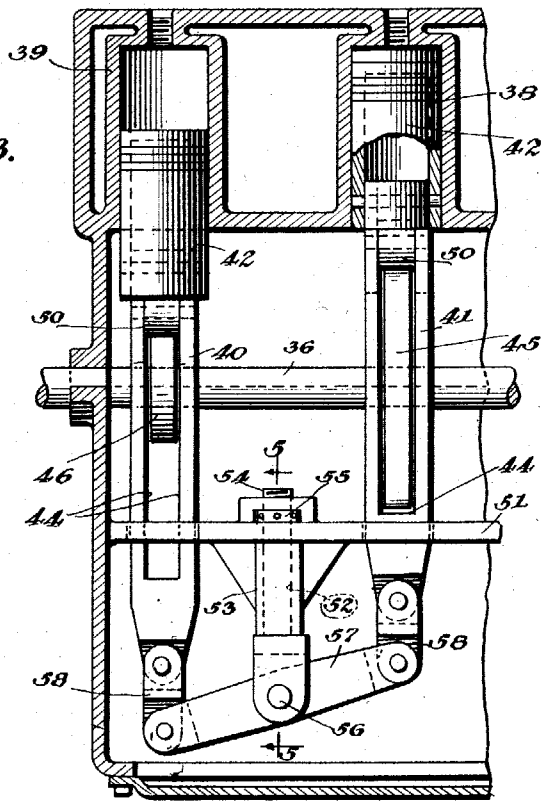
Figure 3 is a vertical longitudinal section taken through one end portion of an internal combustion engine of the tandem cylinder type, and showing a modified form of my invention applied thereto.

In the modified form shown in Figures 3 to 5 inclusive, the engine drive shaft 36 extends through a casing 37 of a motor wherein the cylinders 38 and 39 are disposed in tandem relation. The rods 40 and 41 of the pistons 42 are provided with oblong openings 43 for the reception of the engine shaft 36, and are additionally provided with slots 44 disposed at right angles to the openings 43 and adapted for permitting rotation of cams 45 and 46 rigidly secured to the shaft 36. The cams 45 and 46 are oblong, with their central portions secured to shaft 36, their ends being rounded as indicated at 47. Two inwardly curved portions 48 and 49 are provided at each side of each of the cams, and the cams are so disposed that their ends and curved side portions bear upon rollers 50 which are secured in the upper or inner ends of the slots 44, all of which is shown in Figures 3 and 4.

The case 37 is provided with a horizontally disposed guide 51 located below the engine shaft 36. The lower end portions of the piston rods 40 and 41 are adapted to slide within the guide 51. The guide also provides a support for an adjustable hanger which consists of a third shaft 52 disposed within a sleeve 53 depending from the guide 51, with one end of the shaft extending upwardly through the guide and screw threaded as at 54 with an adjusting nut 55 screwed thereon and operating to adjust the hanger vertically and secure the same within the sleeve 53. The lower end of the shaft 52 terminates in a yoke which has a transversely disposed pivot 56 to which is connected the central portion of a beam 57, the opposite ends of which are connected by links 58 to the lower ends of the piston rods 40 and 41. The cams 45 and 46 are arranged so that one extends at right angles to the other, as shown in Figures 3 and 4, and in respect to this disposition of the cams 45 and 46 and the connection between the piston rods, the operation of the parts corresponds to that described in connection with the parts shown in Figure 1.

From the foregoing it is to be observed that the device of the present invention operates to impart rotary motion to the drive shaft of machinery without the use of cranks, and it is further adapted to operate more evenly and with better balance than can be had by the employment of the usual crank shaft. The straight line movements of the piston rods during their power strokes operate to develop greater power than can be had by the use of oscillating piston rods which go to provide the present form of connection between pistons and crank shafts.

The provision of the present construction eliminates the use of costly crank rod bearings and the expense incident to the replacement of these after they have become worn in use.

Although I have shown and described one embodiment of my invention, it is to be understood that the same is susceptible of various changes; and I reserve the right to employ such as may come within the scope of the appended claims.

I claim:

1. A motor having a plurality of cylinders arranged in parallel rows, each of said cylinders having a piston and a piston rod, a plurality of engine shafts arranged in parallel relation and connected together at one end, oblong cam members secured to said engine shafts and arranged so as to extend one at an angle to the other and disposed so as to bear constantly upon the free ends of said piston rods, a beam member pivotally supported between the said cylinders of the motor and having its opposite ends pivotally connected to the end portions of said piston rods.

2. A motor having a plurality of cylinders arranged in parallel rows, each of said cylinders having a piston and a piston rod, a plurality of engine shafts arranged in parallel relation, a propeller shaft disposed parallel with and between the engine shafts, oblong cam members secured to said engine shafts and arranged so as to extend one at an angle to the other and disposed so as to bear on the free ends of the piston rods, a beam member pivotally supported between the said cylinders and having its opposite ends pivotally connected to the end portions of the piston rods, and a gearing connection between said engine shafts and the propeller shaft.

3. In a motor provided with a drive shaft, paired cylinders arranged with their axes in a plane and having a single piston in each cylinder and a piston rod pivotally connected at one end with the piston, a beam member pivotally mounted between the paired cylinders and pivotally connecting the other ends of the respective rods, and a pair of cam members arranged for the paired cylinders so as to bear constantly upon the beam-connected ends of the respective piston rods, each cam member being mounted in axial alignment with the respective cylinder and having driving connection with the drive shaft.

4. An engine having two reciprocating pistons, piston rods connected to said pistons, non-yielding means positively connecting the free ends of said rods together for causing said rods to move in opposing strokes and two cams cooperating with said means for limiting the movement of said pistons, said cams being shaped and rotated to contact with their respective rods at all times.

5. In combination, an engine having two pistons timed to move in opposing strokes, connecting rods extending from the pistons, two interconnected cams driven by the two rods respectively, and non-yielding means positively connecting the rods and cooperating with the normal piston movement in positively defining the paths of the rods, the two cams being shaped to correspond to the paths of the connecting rods for remaining in continuous contact therewith.

6. In an engine, two revolvably mounted and interconnected cams, two members active thereon, means for reciprocating the members and non-yielding means positively interconnecting the members and causing the same to co-operate in maintaining continuous contact with the cams.

7. In an engine, two revolvably mounted and interconnected cams, two members active thereon, means for reciprocating the members, means associated with each member for guiding the same directionally and non-yielding means interconnecting the latter means for causing one of the members to limit the movement of the other member.

8. In an engine, two revolvably mounted and interconnected cams, two members active thereon, means for reciprocating the members, two pivoted arms guiding the same members directionally and non-yielding connecting means between the arms causing the movement of one of the arms to be limited by the other.

PAUL MARCHETTI.